US006949738B2

(12) United States Patent
Yamaguchi et al.

(10) Patent No.: US 6,949,738 B2
(45) Date of Patent: Sep. 27, 2005

(54) MASS SPECTROMETER AND METHOD OF DETERMINING MASS-TO-CHARGE RATIO OF ION

(75) Inventors: Shinichi Yamaguchi, Kyouto-fu (JP); Morio Ishihara, Osaka-fu (JP); Michisato Toyoda, Osaka-fu (JP)

(73) Assignees: Shimadzu Corporation, Kyoto (JP); Osaka University, Suita (JP)

( * ) Notice: Subject to any disclaimer, the term of this patent is extended or adjusted under 35 U.S.C. 154(b) by 0 days.

(21) Appl. No.: 10/983,571

(22) Filed: Nov. 9, 2004

(65) Prior Publication Data

US 2005/0103992 A1 May 19, 2005

(30) Foreign Application Priority Data

Nov. 14, 2003 (JP) ....................................... 2003-384621

(51) Int. Cl.[7] .......................... B01D 59/44; H01J 49/00

(52) U.S. Cl. ......................... 250/287; 250/282; 250/291

(58) Field of Search ................................ 250/281, 282, 250/287, 291

(56) References Cited

U.S. PATENT DOCUMENTS 6,300,625 B1 * 10/2001 Ishihara ...................... 250/287
6,867,414 B2 * 3/2005 Buttrill, Jr. ................. 250/287
2003/0150987 A1 * 8/2003 Guevremont et al. ....... 250/287
2004/0159782 A1 * 8/2004 Park ........................... 250/282

FOREIGN PATENT DOCUMENTS

| | | |
|---|---|---|
| JP | 11-195398 | 7/1999 |
| JP | 2000-243345 | 9/2000 |
| JP | 2003-86129 | 3/2003 |

* cited by examiner

*Primary Examiner*—John R. Lee
*Assistant Examiner*—Jennifer Yantomo
(74) *Attorney, Agent, or Firm*—Westerman, Hattori, Daniels & Adrian, LLP

(57) ABSTRACT

The present invention provides a time of flight mass spectrometer having a spiral flight path, whose mass resolution can be appropriately changed with respect to the analysis object or other factor without any complicated alteration or addition of the mechanical construction. In a specific form of the invention, the mass spectrometer includes deflecting electrodes 20–23 located between semi-cylindrical electrodes 11 and 12 for making ions fly along a spiral path. The deflecting electrodes 20–23 generate deflecting electric fields for shifting the ions in the axial direction of the semi-cylindrical electrodes 11 and 12. The voltage applied to the deflecting electrodes 20–23 is changed according to the mass resolution required. The deflecting electric fields are generated or removed with the change of the voltage, which makes the ions fly either along a spiral path or in the same loop orbit. The flight distance of the ions can be controlled as desired by regulating the voltage so that the ions fly in the loop orbit an appropriate number of times. Thus, the mass resolution can be arbitrarily controlled.

9 Claims, 2 Drawing Sheets

TOP VIEW

SECTION ALONG FLIGHT PATH (DEFLECTING ELECTRIC FIELD NOT PRESENT)

SECTION ALONG FLIGHT PATH (DEFLECTING ELECTRIC FIELD PRESENT)

MASS SPECTROMETER AND METHOD OF DETERMINING MASS-TO-CHARGE RATIO OF ION

The present invention relates to a mass spectrometer, and especially to a time of flight mass spectrometer (TOF-MS).

BACKGROUND OF THE INVENTION

In a TOF-MS, ions accelerated by an electric field are injected into a flight space where no electric field or magnetic field is present. The ions are separated by their mass-to-charge ratios according to the total flight time until they reach and are detected by a detector. Since the difference of the lengths of flight time of two ions having different mass-to-charge ratios is larger as the flight path is longer, it is preferable to design the flight path as long as possible in order to enhance the resolution of the mass-to-charge ratio (or mass resolution) of a TOF-MS. In many cases, however, it is difficult to incorporate a long straight path in a TOF-MS due to the limited overall size, so that various measures have been taken to effectively lengthen the flight length.

In the Japanese Unexamined Patent Publication No. H11-195398, an elliptical orbit is formed using plural toroidal type sector-formed electric fields, and the ions are guided to fly repeatedly in the elliptical orbit a number of times, whereby the effective flight length is elongated. In this TOF-MS, as the number of turns the ions fly in the orbit increases, the flight distance is larger and the length of flight time is accordingly longer, so that the mass resolution becomes better by increasing the number of turns.

When, as described above, ions repeatedly fly in a loop orbit, ions having smaller mass-to-charge ratios will gain higher speeds. Therefore, ions having a smaller mass-to-charge ratio may lap other ions having larger mass-to-charge ratios while they are orbiting. If the detector simultaneously detects a group of ions mixed with different number of times, it is impossible to determine the mass-to-charge ratios of the ions without knowing the number of turns of each ion.

The Japanese Unexamined Patent Publication Nos. 2000-243345 and 2003-86129 disclose conventional mass spectrometers constructed to avoid the previously described problem, in which gradually shifting the ions every time they lap the orbit forms a flat spiral flight path. More specifically, the TOF-MS disclosed in the Japanese Unexamined Patent Publication No. 2000-243345 includes a flight space having a polygonal orbit created by a circular arrangement of electric field segments obtained by dividing a cylindrical electric field, and the angle of injecting ions into the electric field segment located at the entrance is appropriately determined so that the ions gradually shift in the axial direction of the cylindrical electric field while they orbit in the cylindrical electric field. The TOF-MS disclosed in the Japanese Unexamined Patent Publication No. 2003-86129, also having a polygonal flight space, generates a deflecting electric field between a pair of adjacent electric field segments for gradually shifting the flying ions in the axial direction of the cylindrical electric field. When the flight path of an ion is spiral, the terminal position of the ion in the axial direction of the cylindrical electric field gradually changes with the number of turns of the ion. Therefore, it is possible to detect such ions that have flown in the orbit a predetermined number of turns by extracting the ions at an appropriate position and introducing them into the detector.

In the above-described TOF-MSs, the number of turns of the ion introduced into the detector is basically determined by the construction of the electrodes for generating the deflecting electric field and the position at which the ions are extracted. This means that the mass resolution of the aforementioned conventional TOF-MSs is fixedly determined by their construction because the mass resolution depends on the number of turns. Therefore, in some cases, ions having different but very close mass-to-charge ratios cannot be separated from each other.

SUMMARY OF THE INVENTION

An object of the present invention is therefore to provide a low-cost mass spectrometer whose mass resolution can be arbitrary set while making use of the aforementioned merit of the spiral flight which enables the separation of the ions according to the number of turns.

According to the present invention, a mass spectrometer includes:

a first electrode unit for forming a sleeve-shaped flight space having at least one opening formed at a peripheral position;

a second electrode unit located at the opening of the flight space for creating a deflecting electric field to shift ions in the axial direction of the flight space; and a flight controller for controlling a voltage applied to the second electrode unit by selecting one of the following two modes: a first mode in which the voltage is controlled so as to make the ions passing through the second electrode unit shift in the axial direction of the flight space to form a spiral flight path; and a second mode in which the voltage is controlled so as to make the ions passing through the second electrode unit fly in a loop orbit within the same plane perpendicular to the axis of the flight space.

The present invention also provides a method of determining the mass-to-charge ratio of an ion using the above-described mass spectrometer.

In a specific mode of the present invention, the first electrode unit includes plural fractional cylindrical electrodes each consisting of arc-shaped substantially concentric inner and outer electrodes, and the fractional cylindrical electrodes are peripherally arranged at predetermined intervals to form the sleeve-shaped flight space having a substantially polygonal form in which an ion exiting from the last cylindrical electric field re-enters the first cylindrical electric field into which the ion was initially injected.

In an example of the mass spectrometer according to the present invention, the flight controller sets the voltage applied to the second electrode unit at zero in the second mode. This removes the deflecting electric field from the second electrode unit, where no deflecting force is exerted on the ions passing through the second electrode unit. Therefore, the ions passing through the second electrode unit does not shift in the axial direction of the flight space but continue flying in the same orbit, i.e. in an orbit lying on a plane perpendicular to the axis, within the sleeve-shaped flight space. This condition allows the ions to fly in the orbit a great number of times and have an accordingly long flight distance, whereby the mass resolution is improved. However, as the flight distance is longer, there is a greater possibility that ions having different numbers of turns are mixed together. This should be prevented by, for example, limiting the range of the mass-to-charge ratio of the ions to be brought into the flight path.

In the first mode, the flight controller generates a predetermined deflecting electric field by setting the voltage applied to the second electrode unit at a predetermined value. This creates a force that makes the ions passing through the second electrode unit shift in the axial direction of the flight space. The ions are slightly shifted in the axial direction every time they pass through the deflecting electric field. As a result, a spiral flight path is formed within the flight space. Use of the spiral flight path enables the separation of the ions with respect to the number of turns. Therefore, only such ions that have spirally flown along the flight path a predetermined number of times can be extracted from the flight space and introduced into the detector. It should be noted that, since the height of the first electrode unit is limited by the construction of the apparatus, there is an upper limit for the number of turns of the ions and accordingly an upper limit for the flight distance if the flight path is spiral.

In the mass spectrometer according to the present invention, after the ions are injected into the flight space and begin flying, the flight controller appropriately selects one of the first and second modes for each turn of the ions. That is, for each turn of the ions, the controller can select whether the injected ions should fly in the same loop orbit or along a spiral flight path. For higher levels of mass resolution, the ions should fly in the same loop orbit a greater number of times. For lower levels of mass resolution, the ions should fly in the same loop orbit a lesser number of times, which may be zero. In a practical example, an appropriate program for switching the operation between the first and second modes is chosen according to the mass resolution set by the user, and the voltage applied to the second electrode unit is controlled according to the program.

The flight path of the ions depends on not only the voltage applied to the second electrode unit but also the direction of injecting ions into the flight space. That is, ions that are injected into the flight space in a direction at an angle to a plane perpendicular to the axial direction of the flight space will fly along a spiral path if there is no deflecting electric field. In this case, the ions, which gradually move in the axial direction of the flight space when there is no deflecting electric field, can be brought into a loop orbit by generating a deflecting electric field that shifts the ions in the opposite direction.

Thus, the TOF-MS having a spiral flight path according to the present invention is constructed so that the mass resolution can be appropriately changed with respect to the analysis object or other factor without any complicated alteration or addition of the mechanical construction. It is capable of correctly separating two ions having very close mass-to-charge ratios and carrying out the mass analysis with a high level of accuracy. When only a low level of mass resolution is required, the mass analysis can be efficiently carried out in a short period of time.

BRIEF DESCRIPTION OF THE DRAWINGS

FIG. 2A is a top view, and FIGS. 2B and 2C are schematic sectional views of the flight space along the flight path P.

DETAILED DESCRIPTION OF A PREFERRED EMBODIMENT

Figure 2A:
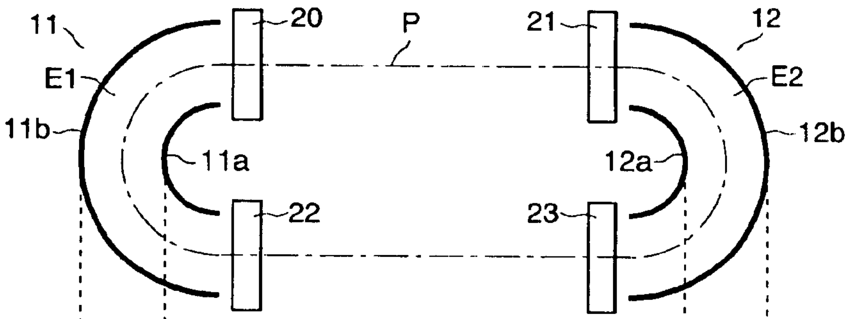
FIGS. 2A–2C are drawings for explaining the principle of the method of controlling the flight of the ions in the mass spectrometer according to the present invention, where
Figure 2B:
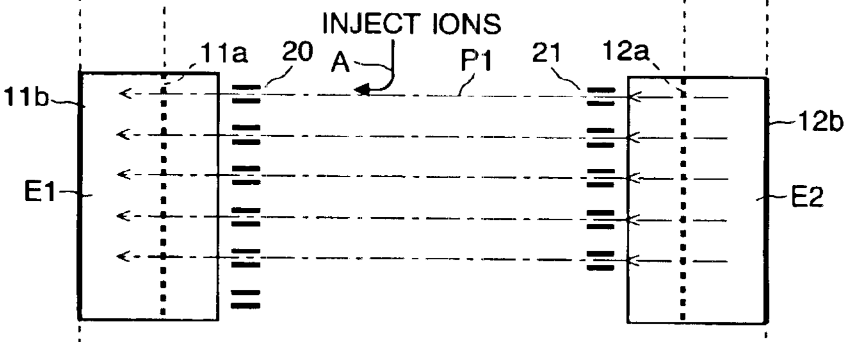
Figure 2C:
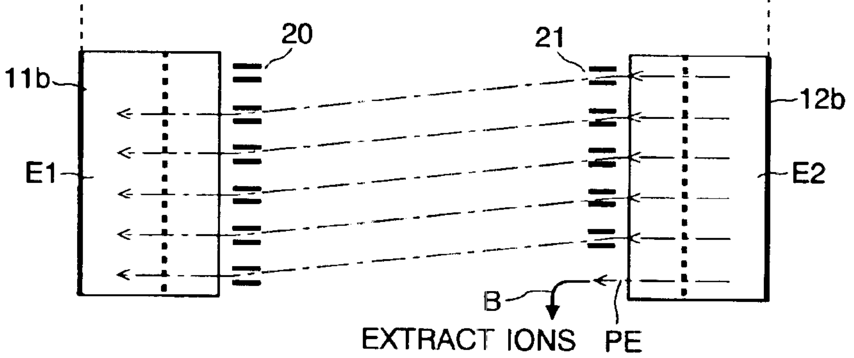

Referring to FIGS. 2A–2C, the method of controlling the flight of the ions according to the present invention is described.

In FIGS. 2A–2C, two semi-cylindrical electrodes 11 and 12 are located at a distance from each other. Each of the electrodes 11 and 12 consists of an inner electrode (11*a*, 12*a*) and an outer electrode (11*b*, 12*b*), which are obtained by vertically dividing a double-walled cylinder into halves. Applying a predetermined voltage to the semi-cylindrical electrodes 11 and 12 will create semi-cylindrical electric fields E1 and E2, in each of which the ions fly along a semi-circular path as shown in FIG. 2A. In the space between the two semi-cylindrical electrodes 11 and 12, the ions are hardly affected by the semi-cylindrical electric fields E1 and E2, and fly almost in a straight path. As a result, with the presence of the semi-cylindrical electric fields E1 and E2, the ions fly along the central path indicated by symbol P in FIG. 2A. Thus a sleeve-shaped flight space is formed.

Between the two semi-cylindrical electrodes 11 and 12, deflecting electrodes 20, 21, 22 and 23 are provided to shift ions in the axial direction of the semi-cylindrical electric fields E1 and E2. As shown in FIGS. 2B and 2C, each of the deflecting electrodes 20, 21, 22 and 23 consists of plural pairs of parallel plate electrodes located at different levels in the axial direction of the semi-cylindrical electric fields E1 and E2. When a predetermined voltage is applied between a pair of the parallel plate electrodes, a deflecting electric field for shifting the ions in the axial direction of the semi-cylindrical electric fields E1 and E2 is created between the parallel plate electrodes. The deflecting electrodes 20, 21, 22 and 23 are constructed so that different voltages can be applied to the different levels of the plate electrodes for different periods of time. This allows the deflecting electric field for shifting ions in the axial direction of the semi-cylindrical electric field E1 and E2 to be controlled independently for each pair of the plate electrodes.

Though not shown in FIGS. 2A–2C, an entrance gate electrode for injecting ions into the flight path and an exit gate electrode for making the flying ions leave the flight path and enter the detector are located between the two cylindrical electrodes 11 and 12. It is supposed that ions are injected into the loop orbit P1 located at the top level, as indicated by arrow A shown in FIG. 2B, and extracted from the loop orbit PE located at the bottom level, as indicated by arrow B in FIG. 2C.

Suppose that an ion is injected into the loop orbit P1 as shown in FIG. 2B. If the voltage applied to the deflecting electrodes 20, 21, 22 and 23 is zero, the ion injected into the loop orbit P1 keeps flying in the same orbit because there is no deflecting electric field. If there is another ion flying in another loop orbit located below, the ion also keeps flying in that orbit. Thus, the ions keep orbiting within the planes perpendicular to the axis of the semi-cylindrical electric fields E1 and E2, as shown in FIG. 2B. As long as the ions keep flying in the same orbits, they never reach the exit gate electrode and can theoretically keep flying endlessly. Therefore, the flight length can be very extended. It should be noted, however, that, if there are plural ions having different mass-to-charge ratios flying in the same orbit, they have different speeds corresponding to their mass-to-charge ratios and some ions may lap other ions during the flight. If this occurs, plural ions having different numbers of turns are mixed together and cannot be separated from each other.

Now, suppose that a predetermined voltage V is applied to the deflecting electrodes 20, 21, 22 and 23. This generates a deflecting electric field between each pair of the parallel plate electrodes included in the deflecting electrodes 20, 21, 22 and 23, which acts on the ions passing through it and shifts them in the axial direction of the semi-cylindrical electric fields E1 and E2. This makes the ions move down to the next level of the parallel plate electrodes for every turn of the ion. As a result, the overall flight path is formed like a descending spiral. Ions flying along this flight path will finally reach the exit gate electrode, leave the orbit, and enter the detector. It should be noted that, in the present case, the number of turns of the injected ions is predetermined. That is, the flight path is fixed and, accordingly, the mass resolution is fixed.

In the present embodiment, after various ions to be analyzed are injected into the highest loop orbit P1, the mass spectrometer can be operated to switch from one mode in which the ions fly in the same loop orbits (FIG. 2B) to the other mode in which the ions fly along the spiral flight path (FIG. 2C), or vice versa, by appropriately controlling the voltage applied to the deflecting electrodes 20, 21, 22 and 23 so as to generate or remove the deflecting electric field. This operation provides an arbitrary (but discrete) setting of the flight distance from the introduction to the extraction of the ions. Thus, the mass resolution can be varied.

In the above operation, it is possible to apply different voltages to the different levels of the parallel plate electrodes of the same deflecting electrode 20, 21, 22 or 23, if necessary.

Figure 1:
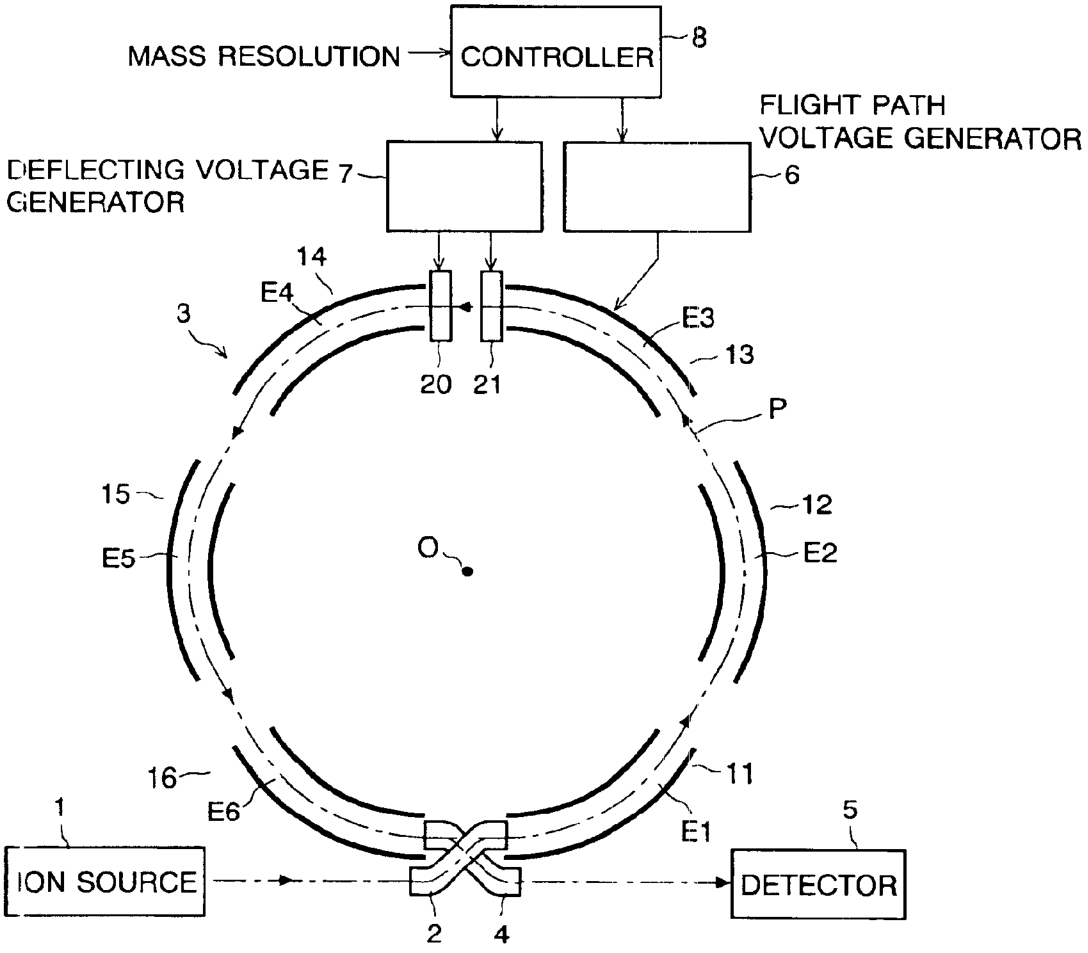
FIG. 1 is a schematic diagram of a mass spectrometer as an embodiment of the present invention.

As an embodiment of the present invention, a mass spectrometer designed on the basis of the above-described principle is described with reference to the attached drawings. FIG. 1 is a schematic diagram of the mass spectrometer in the present embodiment, which includes the top view of the flight space 3 similar to FIG. 2A.

In the mass spectrometer of the present embodiment, six pieces of fractional cylindrical electrodes 11, 12, 13, 14, 15 and 16 of the same shape, which are obtained by dividing a double-walled cylinder at angular intervals of 60 degrees, are arranged around the axis O at equal angular intervals. These electrodes form a substantially hexagonal flight space 3, or a sleeve-shaped flight space, in which the ions fly along the central path P shown in FIG. 1. Deflecting electrodes 20 and 21, which are constructed as described previously, are located between the cylindrical electrodes 13 and 14 and make the ions passing through them shift in the direction of the axis O. Between the fractional cylindrical electrodes 11 and 16, an entrance gate electrode 2 and an exit gate electrode 4 are placed, where ions generated by the ion source 1 enter the flight space 3 through the entrance gate electrode 2, and exit from the flight space 3 through the exit gate electrode 4 to the detector 5. These electrodes 2 and 4 are separated from each other in the direction of the axis O. Though the arrangement of the fractional cylindrical electrodes 11–16 and other specific constructions are different from FIGS. 2A–2C, the basic idea regarding the electrodes and the flight path described previously are also applicable to the present case.

The flight path voltage generator 6 applies a predetermined voltage to the fractional cylindrical electrodes 11–16 to create fractional cylindrical electric fields E1–E6 of the same strength. The deflecting voltage generator 7 applies another predetermined voltage to the deflecting electrodes 20 and 21. The voltages generated by the two voltage generators 6 and 7 are controlled by the controller 8 including a computer or a similar device as its main component. The deflecting voltage generator 7 can apply different voltages to the different levels of the parallel plate electrodes arranged within the deflecting electrodes 20 and 21 along the axis O of the fractional cylindrical electric fields E1–E6, as already explained.

The ion source 1 gives kinetic energy to the ionized molecules, which are the target of the analysis, to inject them into the flight space 3. The molecules may be ionized by any method. When, for example, the present mass spectrometer is used for a gas chromatograph/mass spectrometer (GC/MS), the ion source 1 is constructed to ionize gas molecules by electron impact ionization or chemical ionization. When the present mass spectrometer is used for a liquid chromatograph/mass spectrometer (LC/MS), the ion source 1 is constructed to ionize liquid molecules by atmospheric chemical ionization or electrospray ionization. A method called MALDI (Matrix Assisted Laser Desorption Ionization) is suitable for the analysis of proteins or similar high-molecular compounds. The detector 5 is, for example, a photomultiplier, which generates a signal (ion intensity signal) corresponding to the number or amount of ions received and sends the signal to a data processor (not shown).

The basic steps of the analysis carried out by the present mass spectrometer are as follows. The user sets the mass resolution according to the analysis object and other factors, and starts the analysis. Then, the controller 8 starts controlling the flight path voltage generator 6 and the deflecting voltage generator 7 according to a predetermined program. The control pattern of the deflecting voltage generator 7 is changed according to the mass resolution; the deflecting electric fields created by the deflecting electrodes 20 and 21 may be static throughout the analysis or changed at some point in time. The controller 8 also controls the ion source 1 to give kinetic energy to the ions to be analyzed. This makes the ions leave the ion source 1 and begin flying. After leaving the ion source 1, the ions enter the flight space 3 through the entrance gate electrode 2.

After entering the flight space 3, the ions basically fly along the central path P. During the flight, if a deflecting electric field is present when the ions pass through the deflecting electrodes 20 and 21, the ions are shifted in the direction of the axis O and brought into the spiral path. If the deflecting electric field is not present, the ions keep flying in the same loop orbits. Thus, the state of the voltage applied to the deflecting electrodes 20 and 21 by the deflecting voltage generator 7 determines the flight path of the ions and, accordingly, the flight distance to the exit gate electrode 4. On reaching the exit gate electrode 4 at the end of the flight through the flight space 3, the ions are released from the binding force of the fractional cylindrical electric fields E1–E6 and sent to the detector 5.

The detector 5 generates an electric current having an intensity corresponding to the number of the ions received, and outputs the electric current as the ion intensity signal. Since the flying speed of an ion depends on its mass-to-charge ratio, plural ions having different mass-to-charge ratios are separated from each other according to their mass-to-charge ratios during the flight from the ion source 1 to the detector 5, and arrive at the detector 5 at different points in time. As the flight distance is longer, the difference in the arrival time of the ions becomes greater. This means that the mass resolution is higher as the flight distance is longer. Taking this into account, the controller 8 controls the deflecting voltage generator 7 to control the voltage applied to the deflecting electrodes 20 and 21 so that an appropriate flight distance for the mass resolution specified by the user is obtained. Thus, the mass analysis can be carried out with the desired mass resolution.

It should be noted that the above-described embodiment is a mere example and can be modified, changed or extended within the spirit and scope of the present invention.

What is claimed is:

1. A mass spectrometer comprising:

a first electrode unit for forming a sleeve-shaped flight space having at least one opening formed at a peripheral position;

a second electrode unit located at the opening of the flight space for creating a deflecting electric field to shift ions in an axial direction of the flight space; and a flight controller for controlling a voltage applied to the second electrode unit by selecting one of following two modes: a first mode in which the voltage is controlled so as to make the ions passing through the second electrode unit shift in the axial direction of the flight space to form a spiral flight path; and a second mode in which the voltage is controlled so as to make the ions passing through the second electrode unit fly in a loop orbit within the same plane perpendicular to the axis of the flight space.

2. The mass spectrometer according to claim 1, wherein the first electrode unit includes plural fractional cylindrical electrodes each consisting of arc-shaped concentric inner and outer electrodes, and the fractional cylindrical electrodes are peripherally arranged at predetermined intervals to form the sleeve-shaped flight space having a substantially polygonal form in which an ion exiting from a last cylindrical electric field re-enters a first cylindrical electric field into which the ion was initially injected.

3. The mass spectrometer according to claim 2, wherein the flight controller sets the voltage applied to the second electrode unit at a predetermined value in the first mode and at zero in the second mode.

4. The mass spectrometer according to claim 2, wherein the ions are injected into the flight space in a direction at an angle to a plane perpendicular to the axis of the flight space, and the flight controller controls the voltage applied to the second electrode unit so that the deflecting electric field brings the ions into a loop orbit.

5. The mass spectrometer according to claim 2, wherein the second electrode unit comprises a deflecting electrode consisting of plural pairs of parallel plate electrodes located at different levels in the axial direction of the flight space, and the flight controller is capable of applying different voltages to the different levels of the plate electrodes for different periods of time.

6. The mass spectrometer according to claim 1, wherein the flight controller sets the voltage applied to the second electrode unit at a predetermined value in the first mode and at zero in the second mode.

7. The mass spectrometer according to claim 1, wherein the ions are injected into the flight space in a direction at an angle to a plane perpendicular to the axis of the flight space, and the flight controller controls the voltage applied to the second electrode unit so that the deflecting electric field brings the ions into a loop orbit.

8. The mass spectrometer according to claim 1, wherein the second electrode unit comprises a deflecting electrode consisting of plural pairs of parallel plate electrodes located at different levels in the axial direction of the flight space, and the flight controller is capable of applying different voltages to the different levels of the plate electrodes for different periods of time.

9. A method of determining a mass-to-charge ratio of an ion using a mass spectrometer having a first electrode unit for forming a sleeve-shaped flight space having at least one opening formed at a peripheral position and a second electrode unit for creating a deflecting electric field, the second electrode being located at the opening of the flight space for shifting ions in an axial direction of the flight space, wherein the method comprises step of controlling a flight of the ion by selecting one of the following two modes: a first mode in which the voltage applied to the second electrode unit is controlled so as to make the ions passing through the second electrode unit shift in the axial direction of the flight space to form a spiral flight path; and a second mode in which the voltage applied to the second electrode unit is controlled so as to make the ions passing through the second electrode unit fly in a loop orbit within the same plane perpendicular to the axis of the flight space.

* * * * *